3,451,762
PROCESS FOR THE CONTINUOUS COLORING OF FIBRES MADE FROM NATURAL OR SYNTHETIC POLYAMIDES OR OF MATERIALS CONTAINING FIBRES OF THIS TYPE
Udo Winfried Hendricks, Cologne-Stammheim, Ergun Tamer, Bergisch Neukirchen, Mathieu Quaedvlieg, Opladen, Hans Klapper, Leverkusen, and Gunther Boehmke and Otto Schneider, Cologne-Flittard, Germany, assignors to Farbenfabriken Bayer, a corporation of Germany
No Drawing. Filed July 9, 1965, Ser. No. 470,901
Claims priority, application Germany, July 25, 1964, F 43,579
Int. Cl. D06p 3/24, 1/10
U.S. Cl. 8—39         12 Claims

ABSTRACT OF THE DISCLOSURE

A dye bath preparation and process for continuously coloring natural or synthetic polyamides by dyeing said material in a dye bath containing an active amount of a sulfonated aryl ether of a polyethylene glycol, the corresponding ethanolamine salts of the sulfonate or the corresponding reaction product of the sulfonated polyglycols.

---

The object of the present invention is to provide a process for the continuous coloring, i.e., dyeing, pad-dyeing or printing of fibres made from natural or synthetic polyamides, or of materials containing fibres of this type, with dyestuffs customarily used for these fibres; the process consists in contacting the fibrous materials with an aqueous emulsion which is obtained when the dyestuffs concerned are dispersed in water in the presence of polyglycol ethers of sulpho group-containing phenols or naphthols substituted by hydrocarbon radicals, or in the presence of reaction products of formaldehyde with such polyglycol ethers, and the preparation is optionally acidified with lower aliphatic carboxylic acids, e.g., formic acid, acetic acid or oxalic acid, or mixed with substances splitting off acid in the hot, e.g., ammonium sulphate, whereupon the fibres or fibre materials are subjected to a treatment in moist heat.

The polyglycol ethers to be used according to the invention include in particular the compounds of the general formula

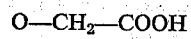

in which Ar stands for the radical of benzene or naphthalene, R denotes a hydrocarbon radical, chiefly a cycloalkyl or aralkyl radical, particularly an alkyl radical containing at least 7 carbon atoms, $R_1$ stands for hydrogen or methyl, while $n$ is a number of 1 to 8, and X stands for OH, Cl, CN, O-alkyl or OOC-alkyl, or for an anionic atom grouping, e.g., for the radical O—$SO_3H$, O—$PO_3H_2$ or O—$CH_2$—COOH; they also include the alkali metal and ammonium salts of these compounds, and also their salts with amines, e.g., ethanolamine, diethanolamine, triethanolamine and cyclohexylamine.

Those polyglycol ethers to be used according to the invention which have the above general formula in which X stands for OH are obtainable, for example, in that phenols or naphthols substituted by hydrocarbon radicals, such as octylphenol, isononylphenol, isododecylphenol and heptylnaphthol, are reacted with ethylene oxide and/or propylene oxide in a molar ratio of 1:2 to 9, the resultant alkoxylation products are then treated with sulphonating agents, for example with concentrated sulphuric acid and/or chlorosulphonic acid, in a molar ratio of 1:at least 2, and the sulpho group-containing sulphuric acid esters formed are subsequently hydrolised with a sodium hydroxide solution. Those polyglycol ethers of the above general formula in which X has one of the other meanings mentioned above, are obtainable in that in the aforesaid alkoxylation products the terminal hydroxyl group is replaced according to known methods by Cl, CN, O—$CH_2$—$CH_2$—CN, O-alkyl, OOC-alkyl,

O—$CH_2$—COOH or O—$PO_3H_2$ followed by sulphonation of the reaction products. The reaction products with formaldehyde can then be prepared from the polyglycol ethers in known manner, for example by means of paraformaldehyde.

Suitable dyestuffs are in the present case, for example, alizarin dyestuffs, azo dyestuffs and metal complex dyestuffs; chromed dyestuffs can also be employed, and it is noteworthy that sodium chromate can also be used as chroming agent, besides chromium trifluoride. The dispersion of the dyestuffs in the aqueous liquor is expediently carried out with heating to about 70–80° C. and with vigorous stirring.

The quality of the dyeings or prints can be improved in many cases by the concurrent use of urea, thiourea or of organic solvents which have a good dissolving power for the dyestuff concerned; in this context, there may be mentioned, for example, butanol, hexanol, 2-ethylhexanol, cyclohexanol, benzyl alcohol, diethylene glycol, triethylene glycol, thio-diethylene glycol, and the monoethyl ether and monobutyl ether of ethylene glycol or diethylene glycol.

The proportions between the components of the aqueous preparations to be used according to the invention may vary within wide limits; suitable proportions can easily be determined in each case by preliminary experiments. A content in the aqueous liquor of the polyglycol ethers to be used according to the invention, or of their reaction products with formaldehyde, of about 10–30 g./litre has proved to be expedient.

With the aid of the present invention it is possible to dye or print fibres made from natural or synthetic polyamides, for instance wool and silk or fibres from polyhexamethyleneadipamide and poly-ε-caprolactam, or materials containing such fibres, with the dyestuffs customary for this purpose, in a continuous process and with outstanding quality, even if dyestuffs are used which have a high content of electrolyte-containing diluents. It is a particular advantage of the process according to the invention that no damage to the fibres occurs. It may also be emphasized that even the use of chromed dyestuffs does not impair the feel of the fibre material in the manner otherwise frequently observed.

The following examples serve to illustrate the invention without, however, limiting its scope; the parts given are parts by weight.

EXAMPLE 1

A mixture of 30 parts of the dyestuff No. 14,130, Colour Index (2nd edition) and 600 parts of soft water heated to about 90° C. is mixed while stirring with 30 parts of the polyglycol ether of the formula

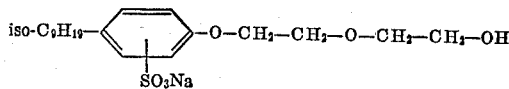

and this mixture is then added to 200 parts of a 3.5% aqueous solution of a commercial carob bean flour derivative. The homogeneous solution is then cooled to about 50° C. and mixed with a solution of 10 parts sodium chromate in 50 parts water. The dyestuff preparation is finally made up with cold soft water to 1000 parts.

A woolen slubbing is impregnated with this dyeing liquor on the foulard, the absorption of liquor amounting to about 80%, and subsequently steamed in a pressure steaming apparatus at 108° C. for 20 minutes. The slubbing is then washed in the back-wash with a commercial detergent, rinsed and acidified with formic acid. An excellent yellow dyeing is obtained which has no grey veil.

The polyglycol ether employed is prepared in the following manner: 254 parts of the alkoxylation product prepared from p-isononylphenol and ethylene oxide in a molar ratio of 1:2 are mixed dropwise at 30–40° C. with 95 parts 93% sulphuric acid. The reaction mixture is stirred at the same temperature for 30 minutes and, after the addition of 70 parts 1,2-dichloroethane, mixed dropwise, again at the same temperature, with 104 parts chlorosulphonic acid. After stirring the reaction mixture at 30–40° C. for three hours, the 1,2-dichloroethane is distilled off under reduced pressure; the residue is mixed with a solution of 108 parts sodium hydroxide in 250 parts water and stirred at 80–90° C. for 3 hours. The reaction mixture then separates into two phases; the lower aqueous phase is removed and from the upper phase which contains the polyglycol ether mentioned above, the water still present is distilled off under reduced pressure at 70–80° C.

EXAMPLE 2

A mixture of 30 parts of the dyestuff No. 18,940, Colour Index (2nd edition) and 600 parts of soft water heated to about 90° C. is mixed while stirring with 20 parts of the polyglycol ether of the formula

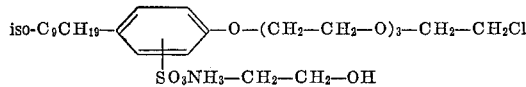

and this mixture is then added to 200 parts of a 3.5% aqueous solution of a commercial carob bean flour derivative. The homogeneous solution is then cooled to about 50° C. and treated with a mixture of 20 parts chromic fluoride, 10 parts oxalic acid, 7 parts glacial acetic acid and 50 parts of hot water. The dyestuff preparation is finally made up with cold soft water to 1000 parts.

A woolen slubbing is impregnated with this dyeing liquor on the foulard, the absorption of liquor amounting to about 80%, and subsequently steamed in a pressure steaming apparatus at 108° C. for 20 minutes. The slubbing is then washed in the back-wash with a commercial detergent, rinsed and acidified with formic acid. An excellent orange dyeing is obtained, which has no grey veil.

The polyglycol ether employed is prepared in the following manner: 397 parts of the alkoxylation product prepared from p-isononyphenol and ethylene oxide in a molar ratio of 1:4 are mixed dropwise at 70–80° C., after the addition of 3 parts active charcoal, with 180 parts thionyl chloride. The reaction mixture is stirred at the same temperature for 2 hours, the excess thionyl chloride distilled off and the active charcoal filtered off with suction. The reaction product obtained is mixed first with 450 parts chloroform and then dropwise at 10–15° C. with 116 parts chlorosulphonic acid. The reaction mixture is stirred at 30–40° C. for 4 hours, the chloroform then distilled off at the same temperature under reduced pressure, and the residue neutralised with ethanolamine.

EXAMPLE 3

A mixture of 30 parts of the dyestuff No. 14,130, Colour Index (2nd edition) and 600 parts of soft water heated to about 90° C. is mixed while stirring with 20 parts of the polyglycol ether of the formula

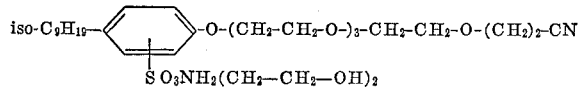

and this mixture is then added while stirring to 200 parts of a 3.5% aqueous solution of a commercial carob bean flour derivative. The solution is then cooled to about 50° C. and mixed with a solution of 10 parts sodium monochromate in 50 parts of water. The dyestuff preparation is finally made up with cold soft water to 1000 parts.

A woollen slubbing is impregnated with this dyeing liquor on the foulard, the absorption of liquor amounting to about 80%, and subsequently steamed in a steaming apparatus with saturated steam at about 102° C. for 45 minutes. The slubbing is then washed in the back-wash with a commercial detergent, rinsed and acidified with formic acid. An excellent yellow dyeing is obtained, which has outstanding fastness properties and exhibits no grey veil.

The polyglycol ether employed is prepared in the following manner: 397 parts of the alkoxylation product prepared from p-isononylphenol and ethylene oxide in a molar ratio of 1:4 are mixed at 40–50 C. with 9 parts of a 45% sodium hydroxide solution and 61 parts acrylonitrile, the mixture is stirred at 50–60° C. for 3 hours and then neutralised with dilute hydrochloric acid. The water and excess acrylonitrile are then distilled off in a vacuum and 116 parts chlorosulphonic acid are added dropwise at 10–15° C. to the remaining reaction product. The mixture is then stirred at 30–40° C. for 4 hours, kept in a vacuum at 30–40° C. for 1 hour to remove the hydrogen chloride formed, and subsequently neutralised with diethanolamine.

EXAMPLE 4

A mixture of 30 parts of the dyestuff No. 14,855, Colour Index (2nd edition) and 500 parts of soft water heated to about 90° C. is mixed while stirring with 30 parts of the polyglycol ether of the formula

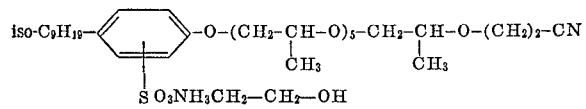

and this mixture is then added to 300 parts of a 3.5% aqueous solution of a commercial carob bean flour derivative. The solution is then cooled to about 50° C. and treated with a mixture of 10 parts sodium chromate, 10 parts ammonium sulphate and 50 parts water. The dyestuff preparation is finally made up with cold soft water to 1000 parts.

A woollen slubbing is printed with the printing paste thus obtained on a Vigoureux printing machine (roller 80:20) and subsequently steamed in a steaming apparatus with saturated steam at 102° C. for 1 hour. The slubbing is finally washed in the back-wash with a commercial detergent, rinsed and acidified. A blue dyeing of very good fastness properties is obtained.

The polyglycol ether employed is prepared in the following manner: an alkoxylation product prepared from p-isononylphenol and propylene oxide in a molar ratio of 1:6 is reacted according to the instructions given in Example 3 with acrylonitrile in an alkaline medium, the reaction product formed is sulphonated with chlorosulphonic acid and the sulphonation product thus obtained finally neutralised with monoethanolamine.

EXAMPLE 5

A mixture of 30 parts of the dyestuff No. 58,005, Colour Index (2nd edition) and 600 parts soft water heated to about 90° C. is mixed while stirring with 20 parts of the polyglycol ether of the formula

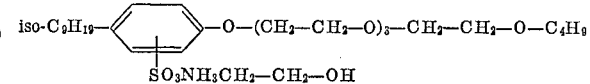

and this mixture is then added to 200 parts of a 3.5% aqueous solution of a carob bean flour derivative. The solution is then cooled to about 50° C. and treated with a mixture of 20 parts chromic fluoride, 10 parts oxalic acid, 7 parts glacial acetic acid and 50 parts hot water. The dyestuff preparation is finally made up with cold soft water to 1000 parts.

A woollen gabardine is impregnated on the foulard with this dyeing liquor, the absorption of liquor amounting to about 80%. The gabardine is then rolled up and the roll rotated in a heating chamber at about 100° C. for 2 hours. The fabric is then washed with a commercial detergent at about 50° C., rinsed and acidified. An excellent bluish red dyeing with very good fastness properties is obtained.

The polyglycol ether employed is prepared in the following manner: 250 parts of the reaction product described in Example 2 and obtained from fourfold ethoxylated p-isononylphenol and thionyl chloride are added to a solution of 67 parts sodium n-butylate in 350 parts n-butanol; the mixture is stirred at 60–70° C. for 4 hours, the n-butanol is then distilled off under reduced pressure and the precipitated sodium chloride separated. 30 parts chlorosulphonic acid are subsequently added dropwise at 15–20° C. to 114 parts of the remaining oil; after stirring at 40–45° C. for three hours, the reaction mixture is kept at the same temperature in a vacuum for some time, to remove the hydrogen chloride formed, and then neutralised with ethanolamine.

EXAMPLE 6

A mixture of 30 parts of the dyestuff No. 19,360, Colour Index (2nd edition) and 500 parts of soft water heated to about 90° C. is mixed while stirring with 30 parts of the polyglycol ether described in Example 5 and this mixture is then added to 300 parts of a 3.5% aqueous solution of a commercial carob bean flour derivative. The solution is then cooled to about 50° C. and mixed with a solution of 10 parts sodium chromate in 50 parts water. The dyestuff preparation is finally made up with cold soft water to 1000 parts.

A woollen slubbing is printed with the dyestuff preparation thus obtained on a Vigoureux printing machine (roller 50:50) and subsequently steamed in a steamer with saturated steam at about 102° C. for 1 hour. The slubbing is then washed with a commercial detergent at about 50° C., rinsed and acidified. An excellent bordo dyeing with outstanding fastness properties is thus obtained.

EXAMPLE 7

The procedure is the same as that described in Example 5, but with the difference that, instead of the polyglycol ether therein described, there are used 20 parts of the polyglycol ether of the formula

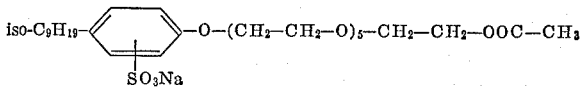

The polyglycol ether employed is prepared in the following manner: 485 parts of the alkoxylation product prepared from p-isononylphenol and ethylene oxide in a molar ratio of 1:6 are mixed at 60–70° C. with 163 parts acetic anhydride and the mixture is subsequently stirred for 3 hours. The acetic anhydride and the acetic acid formed are then distilled off in a vacuum. 220 parts of the acetylation product thus obtained are mixed first with 200 parts 1,2-dichloroethane and then dropwise at 10–15° C. with 49 parts chlorosulphonic acid. The mixture is then stirred at 30–40° C. for 3 hours, the 1,2-dichloroethane distilled off under reduced pressure and the residue neutralised with a concentrated sodium hydroxide solution.

EXAMPLE 8

A mixture of 50 parts of the dyestuff No. 15,710, Colour Index (2nd edition) and 550 parts of soft water heated to about 90° C. is mixed while stirring with 50 parts of a paste containing a formaldehyde reaction product as described below and with 50 parts urea, and this mixture is then added to 100 parts of a 3.5% aqueous solution of a commercial carob bean flour derivative. The solution is then cooled to about 50° C. and treated with a mixture of 30 parts chromic fluoride, 30 parts of 50% formic acid and 100 parts hot water. The dyestuff preparation is finally made up with cold soft water to 1000 parts.

A woollen slubbing is impregnated with this dyeing liquor on the foulard, the absorption of liquor amounting to about 90%, and subsequently steamed in a pressure steaming apparatus at about 108° C. with saturated steam for 20 minutes. The slubbing is then washed in the back-wash with a commercial detergent at about 50° C., rinsed and acidified. An excellent deep black dyeing is obtained, which has very good fastness properties and exhibits no grey veil.

The paste employed is prepared in the following manner: 530 parts of the reaction product prepared according to the instructions given in Example 3 from fourfold ethoxylated p-isononylphenol, acrylonitrile and chlorosulphonic acid in the form of the free sulphonic acid, are mixed in the course of 30 minutes at 30–40° C. with 30 g. paraformaldehyde, and the mixture is stirred at the same temperature for 2 to 3 hours. The highly viscous formaldehyde reaction product thus obtained is then mixed while stirring with 370 parts water and subsequently neutralised with ethanolamine.

EXAMPLE 9

A mixture of 20 parts of the 2:1 chromium complex of the monoazo dyestuff 1-hydroxy-2-aminobenzene-5-sulphodimethylamide→1 - phenyl - 3 - methylpyrazolone and 600 parts of soft water heated to about 90° C. is mixed while stirring with 20 parts of the polyglycol ether described in Example 3, and this mixture is then added to 200 parts of a 3.5% aqueous solution of a commercial carob bean flour derivative. The solution is then mixed with 20 parts of 80% acetic acid and made up with cold soft water to 1000 parts.

A ski gabardine produced from equal parts of wool and curled synthetic polyamide fibres is impregnated with this dyeing liquor on the foulard, the absorption of liquor amounting to about 70%, and subsequently steamed in a steaming apparatus with saturated steam at about 108° C. for 8 minutes. The gabardine is then washed with a commercial detergent at about 50° C. and then rinsed. A very fine scarlet dyeing is obtained.

EXAMPLE 10

A mixture of 30 parts of the 2:1 chromium complex of the monoazo dyestuff anthranilic acid→1-phenyl-3-methylpyrazolone and 600 parts of soft water heated to about 90° C. is mixed while stirring with 30 parts of the paste described in Example 8, and this mixture is then added to 200 parts of a 3.5% aqueous solution of a commercial carob bean flour derivative. The solution is then mixed with 20 parts of 80% acetic acid and made up with cold soft water to 1000 parts.

A combed material made of synthetic polyamide fibres is impregnated on the foulard with the dyeing liquor thus prepared, the absorption of liquor amounting to about 70%, and subsequently steamed in a steaming apparatus with saturated steam at about 120° C. for 4 minutes. The combed material is then washed with a commercial detergent at about 50° C. and finally rinsed. An excellent yellow dyeing with very good fastness properties is obtained.

EXAMPLE 11

A mixture of 30 parts of the disazo dyestuff 4,4′-(o-aminobenzene - sulphonyloxy) - diphenyl - dimethylmethane

2 mol 1 - (3′ - sulphophenyl) - 3 - methyl - 5 - aminopyrazole and 600 parts of soft water heated to about 90°

C. is mixed while stirring with 20 parts of the polyglycol ether of the formula

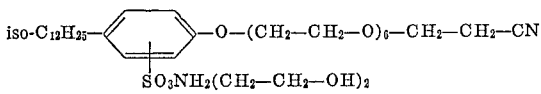

and this mixture is then added to 200 parts of a 3.5% aqueous solution of a commercial carob bean flour derivative. The solution is then mixed with 20 parts of 85% formic acid and made up with cold soft water to 1000 parts.

A woollen slubbing is impregnated on the foulard with this dyeing liquor, the absorption of liquor amounting to about 80%, and subsequently steamed in a steaming apparatus with saturated steam at 102° C. for 15 minutes. The slubbing is then washed in the back-wash with a commercial detergent at about 50° C., rinsed and acidified. A very brilliant yellow dyeing with very good fastness properties is obtained.

The polyglycol ether employed is prepared in the following manner: 526 parts p-isododecyl-phenoxy hexaethylene glycol are mixed with 9 parts of a concentrated sodium hydroxide solution and then at 50–60° C. with 69 parts acrylonitrile. The reaction mixture is stirred at 50–60° C. for four hours and neutralised with hydrochloric acid. The excess acrylonitrile and the water are subsequently distilled off under reduced pressure. The residue is then mixed dropwise at 10–15° C. with 116 parts chlorosulphonic acid and the reaction mixture stirred at 30–40° C. for 4 hours. The reaction product is heated in a vacuum for a short time to remove the hydrogen chloride formed, and subsequently neutralised with diethanolamine.

We claim:

1. A process for the continuous coloring of fibers of natural or synthetic polyamides, or material containing these fibers which comprises contacting the fibers or material with an aqueous emulsion obtained by dispersing dyestuff in water in the presence of one of
   (1) a polyglycol ether of the formula

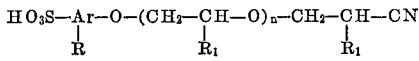

wherein
   Ar is a member selected from the group consisting of phenyl and naphthyl;
   R is a member selected from the group consisting of alkyl, cycloalkyl and aralkyl;
   $R_1$ is hydrogen or methyl;
   n is an integer of 1–8;
   and the corresponding alkali metal, ammonium and amine salts and
   (2) the corresponding reaction product of the polyglycol ether with formaldehyde;
and thereafter treating the fibers or material with moist heat.

2. The process of claim 1 wherein the preparation is acidified with a lower aliphatic carboxylic acid.

3. The process of claim 1 wherein the emulsion contains about 10–30 grams of additive compound per liter of preparation.

4. The process of claim 1 wherein the fibers comprise at least one of wool, silk, polyhexamethyleneadipamide, and poly-ε-caprolactam.

5. The process of claim 1 wherein the dyestuff comprises one of an alizarin dyestuff, an azo dyestuff or the corresponding metal complex thereof, the dyestuff being dispersed in the aqueous liquor at a temperature of about 70–80° C.

6. The process of claim 5 wherein the dyestuff is a chromed dyestuff.

7. The process of claim 1 wherein the emulsion preparation consists essentially of about 30 parts dyestuff, 30 parts of a compound of the formula

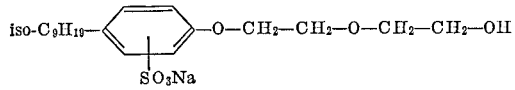

about 200 parts of 3.5% commercial carob bean flour and about 10 parts sodium chromate per liter of preparation.

8. The process of claim 1 wherein the emulsion preparation consists essentially of about 30 parts dyestuff, about 20 parts of a compound of the formula

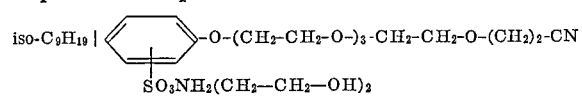

about 200 parts of a 3.5% aqueous solution of a commercial carob bean flour derivative, and about 10 parts of sodium monochromate per liter of preparation.

9. The process of claim 1 wherein the emulsion preparation consists essentially of about 30 parts dyestuff, about 30 parts of a compound of the formula

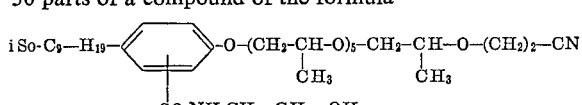

about 300 parts of a 3.5% aqueous solution of a commercial carob bean flour derivative, and a mixture of about 10 parts sodium chromate and 10 parts ammonium sulphate in water, per liter of preparation.

10. The process of claim 1 wherein the fibers are synthetic polyamides.

11. A dye bath emulsion preparation comprising a dyestuff, an active amount of polyglycol ether of the formula

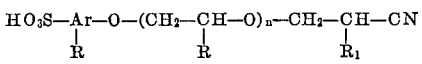

wherein Ar is a member selected from the group consisting of phenyl and naphthyl;
   R is a member selected from the group consisting of alkyl, cycloalkyl, and aralkyl;
   $R_1$ is hydrogen or methyl;
   n is an integer of 1–8;
   and the corresponding alkali metal, ammonium and amine salts; or
   (2) the corresponding reaction product of the polyglycol ether with formaldehyde and water.

12. The dye bath preparation of claim 11 containing about 10–30 grams of the polyglycol ether per liter of preparation.

References Cited

UNITED STATES PATENTS 2,106,716  2/1938  Bruson.
2,178,829  11/1939  Bruson et al.
3,211,514  10/1965  Casty _____ 8—54 XR

OTHER REFERENCES

Bird, "The Theory and Practice of Wool Dyeing," published Sept. 18, 1963, pp. 115, 116, 164, 165, 174–176, published by The Society of Dyers and Colourists, Yorkshire, Eng.

DONALD LEVY, *Primary Examiner.*

U.S. Cl. X.R.

8—21, 41, 42, 43, 54, 55, 89